(12) United States Patent
Suzuki

(10) Patent No.: US 12,337,719 B2
(45) Date of Patent: Jun. 24, 2025

(54) POWER SUPPLY SYSTEM

(71) Applicant: HONDA MOTOR CO., LTD., Tokyo (JP)

(72) Inventor: Kenta Suzuki, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 791 days.

(21) Appl. No.: 17/643,186

(22) Filed: Dec. 8, 2021

(65) Prior Publication Data

US 2022/0185146 A1 Jun. 16, 2022

(30) Foreign Application Priority Data

Dec. 10, 2020 (JP) .................. 2020-204680

(51) Int. Cl.
*B60L 58/18* (2019.01)
*B60L 3/12* (2006.01)

(52) U.S. Cl.
CPC .............. *B60L 58/18* (2019.02); *B60L 3/12* (2013.01); *B60L 2210/10* (2013.01); *B60L 2260/20* (2013.01)

(58) Field of Classification Search
CPC ........ B60L 58/18; B60L 3/12; B60L 2210/10; B60L 2260/20; B60L 15/20; B60L 2250/26; B60L 2270/20; B60L 58/20; B60L 2260/26; B60L 50/60; Y02T 10/70
USPC ......................................................... 702/63
See application file for complete search history.

(56) References Cited

U.S. PATENT DOCUMENTS

| 7,374,506 B2 * | 5/2008 | Bucknor ............... B60W 10/08 475/5 |
| 2016/0039306 A1 * | 2/2016 | Okamura ................ B60L 50/51 903/907 |
| 2016/0039307 A1 * | 2/2016 | Okamura ................ B60L 50/40 903/907 |

FOREIGN PATENT DOCUMENTS

JP 2014212698 A 11/2014

* cited by examiner

*Primary Examiner* — Aditya S Bhat
(74) *Attorney, Agent, or Firm* — CKC & PARTNERS CO., LLC

(57) ABSTRACT

A power supply system includes a travel mode selection button which acquires a driver request, mode; a management ECU which sets, based on the driver request mode, any among a plurality of travel modes as a setting mode; and an electronic control unit group which controls the flow of electric power in the power circuit under conditions according to the setting mode. The management ECU calculates a sum of a first output upper limit of a first battery B1 and a second output upper limit of a second battery B2 as a total output upper limit Pt_lim, calculates a reference output upper limit Pr_lim which is the first output upper limit of the battery B1 in a reference state, and in the case of the setting mode being a normal mode and the upper limit Pt_lim being smaller than the upper limit Pr_lim, inhibits switching to a sport mode.

15 Claims, 8 Drawing Sheets

POWER SUPPLY SYSTEM

This application is based on and claims the benefit, of priority from Japanese Patent Application No. 2020-204680, filed on 10 Dec. 2020, the content of which is incorporated herein by reference.

BACKGROUND OF THE INVENTION

Field of the Invention

The present invention relates to a power supply system. In more detail, it relates to a power supply system which drives a rotary electrical machine under a plurality of travel modes such as a first travel mode driving the rotary electrical machine by the outer power of a first electrical storage device, and a second travel mode of driving the rotary electrical machine by way of power by combining the first electrical storage device and a second electrical storage device.

Related Art

In recent years, development has been active in electric vehicles such as electric transport equipment equipped with a drive motor as a power generation source, and hybrid vehicles equipped with a drive motor and internal combustion engine as power generation sources. In such electric vehicles, an electrical storage device (battery, and capacitor etc.) for supplying electrical energy to the drive motor is also built in. In addition, in recent years, a vehicle equipped with a plurality of electrical storage devices having different characteristics in an electric vehicle has also been developed.

For example, the power supply system illustrated in Patent Document 1 includes a first electrical storage device of capacity type as an electrical storage device supplying electrical energy to a drive motor, and a second electrical storage device of output type having a smaller capacitance and larger output than the first electrical storage device, and controls the input/output of these first and second electrical storage devices in accordance with an allotment ratio decided according to the travel mode designated by the driver.

Patent Document 1: Japanese Unexamined Patent Application, Publication No. 2014-212698

SUMMARY OF THE INVENTION

However, the power capable of being outputted from an electrical storage device has a tendency of declining as the remaining amount of the electrical storage device decreases. For this reason, when the remaining amounts of the first, and second electrical storage devices decline, the total of the power capable of being outputted from these two electrical storage devices may become less than the power capable of being outputted from the first electrical storage device which is in the full charge state, for example.

Herein, a power supply system is considered in which the driver is capable of designating either a sport mode which drives a drive motor with power combining the outputs from the first and second electrical storage devices, and a normal travel mode of driving the drive motor with only the output of the first electrical storage device. With such a power supply system, when the remaining amounts of the first and second electrical storage devices decline as mentioned above, the realized acceleration force may decrease to lower than the acceleration force realized in the normal travel mode irrespective of the driver designating the sport mode as the travel mode, and there is a risk of the driver feeling a sense of discomfort.

The present invention has an object of providing a power supply system of a vehicle which includes two electrical storage devices and drives a rotary electrical machine under a plurality of travel modes, which can reduce the uncomfortable feeling of the driver in relation to the acceleration force realized under the travel mode requested by the driver.

A power supply system (for example, the power supply system 1 described later) according to a first aspect of the present invention includes: a rotary electrical machine (for example, the drive motor M described later) coupled to a drive wheel (for example, the drive wheel W described later) of a vehicle (for example, the vehicle V described later); a first electrical storage device (for example, the first battery B1 described later); a second electrical storage device (for example, the second battery B2 described later); a power circuit (for example, the first power circuit 2, second power circuit 3, voltage converter 5 and power converter 43 described later) connecting the first electrical storage device, the second electrical storage device and the rotary electrical machine; a travel mode setting unit (for example, the management ECU 71 and travel mode selection button 77 described later) for setting based on a request acquired by the travel mode request acquisition unit, as a setting mode, any one from among a plurality of travel modes including a first travel mode (for example, the normal mode described later) of driving the rotary electrical machine by output power of the first electrical storage device, and a second travel, mode (for example, the sport mode described later) of combining output power of the first electrical storage device and output power of the second electrical storage device, and driving the rotary electrical machine by way of power thus combined; a control unit (for example, the electronic control unit group 7 described later) for controlling flow of power in the power circuit based on the setting mode; a total output upper limit acquisition unit; (for example, the management ECU 71, first battery ECU 74 and second battery ECU 75 described later) for acquiring, as a total output, upper limit (for example, the total output upper limit Pt_lim described later), a sum of a first output upper limit (for example, the first output upper limit P1_lim described later) which is an upper limit for power capable of being outputted from the first electrical storage device and a second output upper limit (for example, the second output upper limit P2_lim described later) which is an upper limit for power capable of being outputted from the second electrical storage device; and a reference output upper limit acquisition unit (for example, the management ECU 71 described later) for acquiring a reference output upper limit (for example, the reference output upper limit Pr_lim described later) which is an upper limit for power capable of being outputted from the first electrical storage device in a reference state, in which the travel mode setting unit inhibits a change of the setting mode to the second travel mode, in a case of the setting mode being the first travel mode, and the total output upper limit being smaller than the reference output upper limit.

According to a second aspect of the present invention, in this case, it is preferable for the first electrical storage device to have lower output weight density and higher energy weight density than the second electrical storage device.

According to a third aspect of the present invention, in this case, it is preferable for the reference output upper limit acquisition unit to set a state in which a charge rate is a predetermined reference charge rate as the reference state, and acquire the reference output upper limit.

According to a fourth aspect of the present invention, in this case, it is preferable for the reference output upper limit acquisition unit to set a full charge state as the reference state, and acquire the reference output upper limit.

According to a fifth aspect of the present invention, in this case, it is preferable for the reference output upper limit acquisition unit to set a state during startup of the vehicle as the reference state, and acquire the reference output upper limit.

According to a sixth aspect of the present invention, in this case, it is preferable for the power supply system to further include a notification unit for notifying to a driver of the fact that it is not possible to change the setting mode to the second travel mode, in a case of the setting mode being the first travel mode, and the total output upper limit being smaller than the reference output upper limit.

According to a seventh aspect of the present invention, in this case, it is preferable for the travel mode setting unit, in a case of the setting mode being the first travel mode, the total output upper limit being smaller than the reference output upper limit, and the travel mode request acquisition unit acquiring a request for switching the travel mode from the first travel mode to the second travel mode, combines the output power of the first electrical storage device and the output power of the second electrical storage device, and changes the setting mode from the first travel mode to a third travel mode which drives the rotary electrical machine using power thus combined; and the control unit, in a case of the setting mode being the first travel mode, to control output power of the first electrical storage device so that system output power which is power outputted to a load circuit (for example, the load circuit 4 described later) including the rotary electrical machine from the power circuit becomes no more than the first output upper limit; in a case of the setting mode being the second travel mode, to control output power of the first electrical storage device and output power of the second electrical storage device so that the system output power becomes no more than the total output upper limit; and in a case of the setting mode being the third travel mode, to control the output power of the first electrical storage device and the output power of the second electrical storage device so that the system output power becomes no more than a third output upper limit (for example, the weak boost upper limit Pb_lim described later) decided to be less than the total output upper limit and greater than the first output upper limit.

(1) In the power supply system according to the present invention, the travel mode setting unit sets based on a request, for a travel mode, as the setting mode, any from among a plurality of travel modes includes a first travel mode which travels by the output power of the first electrical storage device; a second travel mode which combines the output power of the first and second electrical storage devices and travels by the combined power, in which the control unit controls the flow of power in the power circuit based on the setting inode. The travel mode setting unit, in the case of the setting mode being the first travel mode and the total output upper limit of the first electrical storage device and the second electrical storage device being smaller than a reference output upper limit of the first electrical storage device in a reference state, inhibits a change in the setting mode to the second travel mode, irrespective of the request for the travel mode. Herein, case of the total output upper limit being smaller than a reference output upper limit corresponds to a case of the current power capable of being outputted to the rotary electrical machine under the second travel mode using the first and second electrical storage devices being smaller than the power capable of being outputted to the rotary electrical machine under the first travel mode using the first electrical storage device in the reference state. Therefore, according to the present invention, it is possible to reduce the uncomfortable feeling sensed by the sense of discomfort felt by the driver by the realized acceleration force being lower than the acceleration force realized under the first travel mode using the first electrical storage device in the reference state, irrespective of setting the travel mode as the second travel mode. In addition, according to the present invention, it is possible to also suppress a decline in the remaining amount of the second electrical storage device.

(2) The present invention uses an electrical storage device having lower output weight density and higher energy weight density than the second electrical storage device as the first electrical storage device. In other words, an electrical storage device of capacity type is used as the first electrical storage device, and an electrical storage device of output type is used as the second electrical storage device which is supplementally used under the second travel mode. Therefore, according to the present invention, it is possible to reduce the frequency of inhibiting a change from the first travel mode to the second travel mode.

(3) In the present invention, the reference output upper limit acquisition unit establishes a state in which the charge rate is a predetermined reference charge rate as a reference state, and acquires the reference output upper limit. Therefore, according to the present invention, it is possible to reduce the uncomfortable feeling sensed by the sense of discomfort felt by the driver by the realized acceleration force being lower than the acceleration force realized under the first; travel mode using the first electrical storage device in a state which is a predetermined reference charge rate, irrespective of setting the travel mode as the second travel mode.

(4) In the present invention, the reference output upper limit acquisition unit establishes a full-charge state as a reference state, and acquires the reference output upper limit. Therefore, according to the present invention, it is possible to reduce the uncomfortable feeling sensed by the sense of discomfort felt by the driver by the realized acceleration force being lower than the acceleration force realized under the first travel mode using the first electrical storage device in a full-charge state, irrespective of setting the travel mode as the second travel mode.

(5) In the present invention, the reference output upper limit acquisition unit establishes a state during startup of the vehicle as a reference state, and acquires the reference output upper limit. Therefore, according to the present invention, it is possible to reduce the uncomfortable feeling sensed by the sense of discomfort felt by the driver by the realized acceleration force being lower than the acceleration force realized under the first travel mode immediately after starting up the vehicle, irrespective of setting the travel mode as the second travel mode.

(6) In the present invention, the notification unit notifies the driver of the matter of not being able to change the setting mode to the second travel mode, in the case of the setting mode being the first travel mode and the total output upper limit being smaller than the reference output upper limit. It is thereby possible to reduce the sense of discomfort felt by the driver, due to not being able to switch the travel mode to the second travel mode.

(7) in the present invention, the travel mode setting unit changes the setting mode to a third travel mode which is separate from the first and second travel modes, in a case of a request for switching the travel mode from the first travel mode to the second travel mode being acquired, while a change from the first travel mode to the second travel mode is being inhibited as mentioned above. In addition, the control device establishes the system output power as no more than the first output upper limit in the case of the setting mode being the first travel mode, establishes the system output power as no more the total output upper limit in the case of the setting mode being the second travel mode, and establishes the system output power as less than the total output upper limit and no more than a weak boost upper limit decided to be greater than the first output upper limit, in the case of the setting mode being the third travel mode. In other words, in the present invention, in the case of a request for switching the travel mode from the first travel mode to the second travel mode being acquired while a change from the first travel mode to the second travel mode is being inhibited, the drive is notified of the matter of not being able to switch the travel mode by way of the notification unit, and the system output power is permitted within a range of no more than the third output upper limit which is decided to be smaller than the upper limit of the second travel mode. It is thereby possible to reduce the sense of discomfort felt by the driver, and react to the acceleration request by the driver as much as possible.

DETAILED DESCRIPTION OF THE INVENTION

Figure 1:
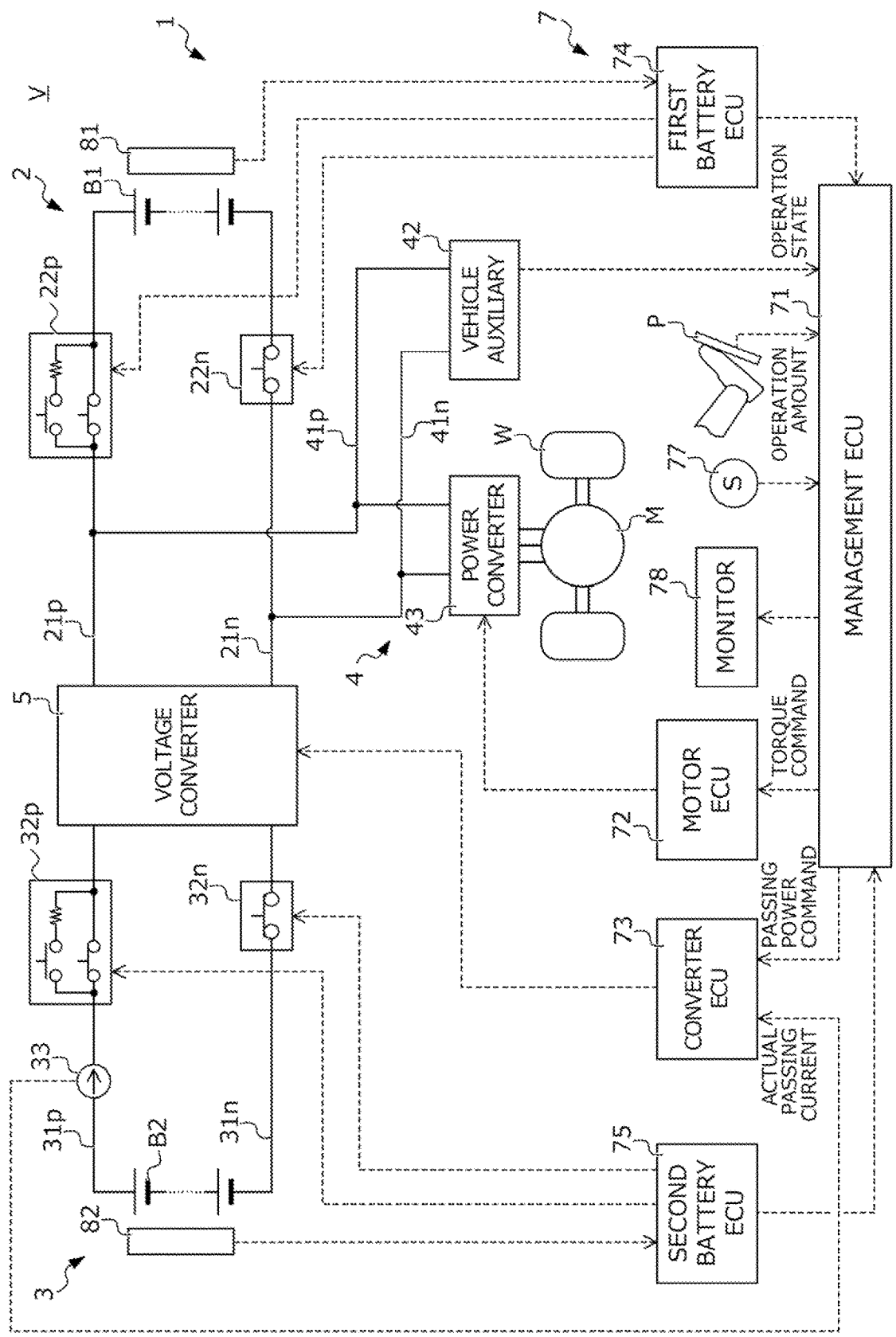
FIG. 1 is a view showing the configuration of an electric vehicle equipped with a power supply system according to an embodiment of the present invention.

Hereinafter, an embodiment of the present invention will be explained while referencing the drawings. FIG. 1 is a view showing the configuration of an electric vehicle V (hereinafter simply referred to as "vehicle") equipped with a power supply system 1 according to the present embodiment.

The vehicle V includes drive wheels W, a drive motor M serving as a rotary electrical machine coupled to these drive wheels W; and a power supply system 1 which performs transferring of power between this drive motor M and a first battery B1 and second battery B2 described later. It should be noted that the present embodiment explains an example in which the vehicle V accelerates and decelerates by the motive power generated mainly by the drive motor M; however, the present invention is not to be limited thereto. The vehicle V may be established as a so-called hybrid vehicle equipped with the drive motor M and an engine as the motive power generation source.

The drive motor M is coupled to the drive wheels W via a power transmission system which is not illustrated. The drive torque generated by the drive motor M by supplying three-phase electricity to the drive motor M from the power supply system 1 is transferred to the drive wheels W via the power transmission system which is not illustrated, causing the drive wheels w to rotate to make the vehicle V travel. In addition, the drive motor M exhibits a function of a generator during deceleration of the vehicle V, generates regenerative electric power, and gives the regenerative braking torque to the drive wheels W responsive to the magnitude of this regenerative electric power. The regenerative electric power generated by the drive motor M is charged to the batteries B1, B2 of the power supply system 1 as appropriate.

The power supply system 1 includes: a first power circuit 2 to which the first battery B1 serving as a first electrical storage device is connected; a second power circuit 3 to which the second battery B2 serving as a second electrical storage device is connected; a voltage converter 5 connecting this first power circuit 2 and second power circuit 3; a load circuit 4 having various electrical loads including the drive motor M; and an electronic control unit group 7 which operates these power circuits 2, 3, 4 and voltage converter 5. In other words, in the power supply system 1, the power circuit connecting the first battery B1 and second battery B2 with the load circuit 4 is configured by the first power circuit 2, second power circuit 3 and voltage converter 5. In addition, by operating the power circuit, a control unit which controls the flow of electric power in the power circuit between the first battery B1 and second battery B2 with the load circuit 4 is configured by the electronic control unit group 7. The electronic control unit group 7 includes a management ECU 71, motor ECU 72, converter ECU 73, first battery ECU 74 and second battery ECU 75, which are each computers.

The first battery B1 is a secondary battery capable of both discharging which converts chemical energy into electrical energy, and charging which converts the electrical energy into chemical energy. Hereinafter, a case is explained using a so-called lithium-ion battery which performs charging/discharging by the lithium ions migrating between electrodes as this first battery B1; however, the present invention is not limited thereto. A capacitor may be used as the first battery B1.

A first battery sensor unit 81 for estimating the internal state of the first battery B1 is provided to the first battery B1. The first battery sensor unit 81 detects a physical quantity required in order to acquire the charge rate of the first battery B1 (value expressing the charged amount of the battery by percentage; increases according to the remaining amount of the first battery B1), the temperature, etc. in the first battery ECU 74, and is configured by a plurality of sensors which send signals according to the detection value to the first battery ECU 74. More specifically, the first battery sensor unit 81 is configured by a voltage sensor that detects the terminal voltage of the first battery B1, a current sensor that detects the electrical current flowing in the first battery B1, a temperature sensor that detects the temperature of the first battery B1, etc.

The second battery B2 is a secondary battery capable of both discharging that converts chemical energy into electrical energy, and charging that converts electrical energy into chemical energy. Hereinafter, a case is explained using a so-called lithium-ion battery which performs charging/discharging by the lithium ions migrating between electrodes as this second battery B2; however, the present invention is not limited thereto. The second battery B2 may employ capacitors, for example.

A second battery sensor unit 82 for estimating the internal state of the second battery B2 is provided to the second battery B2. The second battery sensor unit 82 detects a physical quantity required for acquiring the charge rate, temperature, etc. of the second battery B2 in the second battery ECU 75, and is configured by a plurality of sensors which send signals according to the detection value to the second battery ECU 75. More specifically, the second battery sensor unit 82 is configured by a voltage sensor that detects terminal voltage of the second battery B2, a current sensor that detects the electrical current flowing in the second battery B2, a temperature sensor that detects the temperature of the second battery B2, etc.

Herein, the characteristics of the first battery B1 and the characteristics of the second battery B2 are compared. The first battery B1 has lower output weight density and higher energy weight density than the second battery B2. In addition, the first battery B1 has larger capacity than the second battery B2. In other words, the first battery B1 is superior to the second battery B2 in the point of energy weight density. It should be noted that energy weight density is the electrical energy per unit weight (Wh/kg), and the output weight density is the power per unit weight (W/kg). Therefore, the first battery B1 which excels in the energy weight density is a capacitive battery with the main object of high capacity and the second battery B2 which excels in output weight density is an output-type battery with the main object of high output. For this reason, the power supply system 1 uses the first battery B1 as the main power source, and uses the second battery B2 as an auxiliary power source which supplements the first battery B1.

The static voltage of the batteries B1, B2 (i.e. voltage in a state in which electrical current is not flowing to the battery, referred to as open circuit voltage) has a characteristic of rising with higher charge rate. In addition, the static voltage of the first battery B1 when the charge rate of the first battery B1 is the minimum value, i.e. minimum value of the static voltage of the first battery B1, is higher than the static voltage of the second battery B2 when the charge rate of the second battery B2 is the maximum value (full charge state), i.e. maximum value of static voltage of the second battery B2. For this reason, the static voltage of the second battery B2 during travel of the vehicle V is basically maintained lower than the static voltage of the first battery B1.

The first output circuit 2 includes: the first battery B1, first power lines 21p, 21n which connect both positive and negative poles of this first battery B1 and the positive terminal and negative terminal on the high-voltage side of the voltage converter 5, and a positive contactor 22p and negative contactor 22n provided to these first power lines 21p, 21n.

The contactors 22p, 22n are normal open type which opens in a state in which a command signal from outside is not being inputted and breaks conduction between both electrodes of the first battery B1 and the first power lines 21p, 21n; and closes in a state in which a command signal is being inputted and connects the first battery B1 and first power lines 21p, 21n. These contactors 22p, 22n open/close according to a command signal transmitted from the first battery ECU 74. It should be noted that the positive contactor 22p is a pre-charge contactor having a pre-charge resistance for mitigating the inrush current to a plurality of smoothing capacitors provided to the first power circuit 2, load circuit 4, etc.

The second power circuit 3 includes: the second battery B2, second power lines 31p, 31n which connect both positive and negative poles of this second battery B2 and the positive terminal and negative terminal on the low-voltage side of the voltage converter 5, a positive contactor 32p and negative contactor 32n provided to these second power lines 31p, 31n, and a current sensor 33 provided to the second power line 31p.

The contactors 32p, 32n are normal-open type which open in a state in which a command signal from outside is not being inputted to break conduction between both electrodes of the second battery B2 and the second power lines 31p, 31n, and close in a state in which a command signal is being inputted to connect between the second battery B2 and the second power lines 31p, 31n. These contactor's 32p, 32n open/close in response to a command signal transmitted from the second battery ECU 75. It should be noted that the cathode contactor 32p is a pre-charge contactor having a pre-charge resistance for mitigating the inrush current to a plurality of smoothing capacitors provided to the first power circuit 2, load circuit 4, etc.

The electric current sensor 33 sends a detection signal according to a value of passing current, which is the electrical current flowing through the second power line 31p, i.e. electrical current flowing through the voltage converter 5, to the converter ECU 73. It should be noted that, in the present embodiment, the direction of passing current defines from the second power circuit 3 side to the first power circuit 2 side as positive, and defines from the first power circuit 2 side to the second power circuit 3 side as negative.

The load circuit 4 includes: a vehicle accessory 42, output converter 43 to which the drive motor M is connected, and load power lines 41p, 41n which connect this vehicle accessory 42 and output converter 43 with the first power circuit 2.

The vehicle accessory 42 is configured by a plurality of electrical loads such as a battery heater, air compressor, DC/DC converter, and onboard charger. The vehicle accessory 42 is connected to the first power lines 21p, 21n of the first power circuit 2 by the load power, lines 41p, 41n, and operates by consuming the electric power of the first power lines 21p, 21n. The information related to the operating state of various electrical loads constituting the vehicle accessory 42 is sent to the management ECU 71, for example.

The power converter 43 is connected to the first power lines 21p, 21n so as to be parallel with the vehicle accessory 42, by the load power lines 41p, 41n. The power converter 43 converts the electric power between the first power lines 21p, 21n and the drive motor M. The power converter 43, for example, is a PWM inverter according to pulse width modulation, provided with a bridge circuit configured by a bridge connecting a plurality of switching elements (e.g., IGBT), and is equipped with a function of converting between DC power and AC power. The power converter 43 is connected to the first power lines 21p, 21n on the DC I/O side thereof, and is connected to each coil of the U phase, V phase and W phase of the drive motor M at the AC I/O side thereof. The power converter 43 converts the AC power of the first power lines 21p, 21n into three-phase AC power and supplies to the drive motor M, by ON/OFF driving the switching elements of each phase in accordance with a gate drive signal generated at a predetermined timing from a gate drive circuit (not shown) of the motor ECU 72, and thus generates drive torque in the drive motor M, and converts the three-phase AC power supplied from the drive motor M into DC power and supplies to the first power lines 21p, 21n, and thus generates regenerative braking torque in the drive motor M.

The voltage converter 5 connects the first power circuit 2 and second power circuit 3, and converts the voltage between both circuits 2, 3. A known boost circuit is used in this voltage converter 5.

Figure 2:
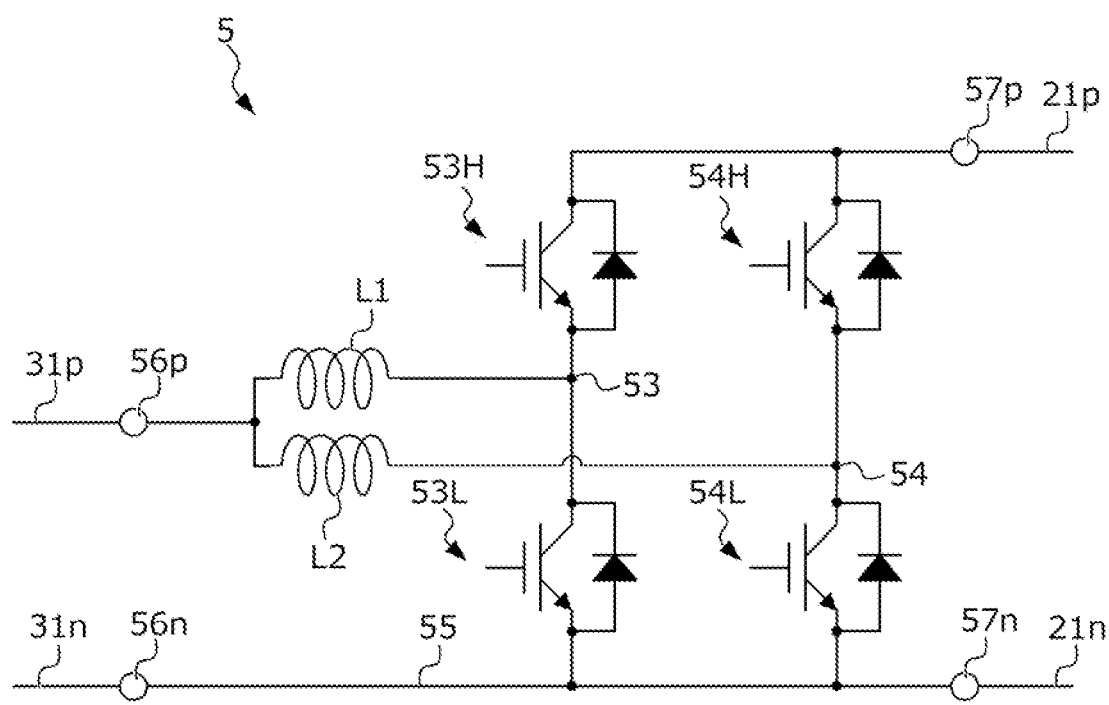
FIG. 2 is a view showing an example of a circuit configuration of a voltage converter.

FIG. 2 is a view showing an example of the circuit configuration of the voltage converter 5. The voltage converter 5 connects the first power lines 21p, 21n to which the first battery B1 is connected, and the second power lines 31p, 31n to which the second battery B2 is connected, and converts the voltage between these first power lines 21p, 21n and second power lines 31p, 31n. The voltage converter 5 is a full-bridge DC/DC converter configured by combining a first reactor L1, a second reactor L2, a first high-arm element 53H, a first low-arm element 53L, a second high-arm element 54H, a second low-arm element 54L, a negative bus 55, low-voltage side terminals 56p, 56n, high-voltage side terminals 57p, 57n, and a smoothing capacitor (not shown).

The low-voltage side terminals 56p, 56n are connected to the second power lines 31p, 31n, and the high-voltage side terminals 57p, 57n are connected to the first power lines 21p, 21n. The negative bus 55 is wiring connecting the low-voltage side terminal 56n and high-voltage side terminal 57n.

The first reactor L1 has one end side thereof connected to the low-voltage side terminal 56p, and the other end side connected to a connector node 53 between the first high-arm element 53H and first low-arm element 53L. The first high-arm element 53H and first low-arm element 53L each include a well-known power switching element such as IGBT or MOSFET, and a freewheeling diode connected to this power switching element. This high-arm element 53H and low-arm element 53L are connected in this order in series between the high-voltage side terminal 57p and negative bus 55.

A collector of the power switching element of the first high-arm element 53H is connected to the high-voltage side terminal 57p, and the emitter thereof is connected to the collector of the first low-arm element 53L. The emitter of the power switching element of the first low-arm element 53L is connected to the negative bus 55. The forward direction of the freewheeling diode provided to the first high-arm element 53H is a direction from the first reactor L1 towards the high-voltage side terminal 57p. In addition, the forward direction of the freewheeling diode provided to the first low-arm element 53L is a direction from the negative bus 55 towards the first reactor L1.

The second reactor L2 has one end side connected to the low-voltage side terminal 56p, and the other end side connected to a connection node 54 between the second high-arm element 54H and second low-arm element 54L. The second high-arm element 54H and second low-arm element 54L each include a well-known power switching element such as IGBT or MOSFET, and a freewheeling diode connected to this power switching element. This high-arm element 54H and low-arm element 54L are connected in this order in series between the high-voltage side terminal 57p and negative bus 55.

A collector of the power switching element of the second high-arm element 54H is connected to the high-voltage side terminal 57p, and the emitter thereof is connected to the collector of the second low-arm element 54L. The emitter of the power switching element of the second low-arm element 54L is connected to the negative bus 55. The forward direction of the freewheeling diode provided to the second high-arm element 54H is a direction from the second reactor L2 towards the high-voltage side terminal 57p. In addition, the forward direction of the freewheeling diode provided to the second low-arm element 54L is a direction from the negative bus 55 towards the second reactor L2.

The voltage converter 5 converts the voltage between the first power lines 21p, 21n and the second power lines 31p, 31n, by alternately driving ON/OFF the first high-arm element 53H and second low-arm element 54L, and the first low-arm element 53L and second high-arm element 54, in accordance with the gate drive signal generated at a predetermined timing from a gate drive circuit (not shown) of the converter ECU 73.

Referring back to FIG. 1, the static voltage of the second battery B2 during travel of the vehicle V is basically maintained lower than the static voltage of the first battery B1 as mentioned above. Therefore, the voltage of the first power lines 21p, 21n is basically higher than the voltage of the second power lines 31p, 31n. Therefore, the converter ECU 73, in a case of driving the drive motor M using both the power outputted from the first battery B1 and the power outputted from the second battery B2, operates the voltage converter 5 so that a boost function is exhibited in the voltage converter 5. Boost function refers to a function of stepping up the power of the second power lines 31p, 31n to which the low-voltage side terminals 56p, 56n are connected, and outputting to the first power lines 21p, 21n to which the high-voltage side terminals 57p, 57n are connected, whereby positive passing current flows from the second power lines 31p, 31n side to the first power lines 21p, 21n side. In addition, in the case of suppressing discharge of the second battery B2, and driving the drive motor M with only the power outputted from the first battery B1, the converter ECU 73 is configured so as to turn OFF the voltage converter 5, and make so that electrical current does not flow from the first power lines 21p, 21n to the second power lines 31p, 31n.

In addition, in the case of charging the first battery B1 or second battery B2 by the regenerative electric power outputted from the drive motor M to the first power lines 21p, 21n during deceleration, the converter ECU 73 operates the voltage converter 5 so as to exhibit a step-down function in the voltage converter 5. Step-down function refers to a function of stepping down the electric power in the first power lines 21p, 21n to which the high-voltage side terminals 57p, 57n are connected, and outputting to the second power lines 31p, 31n to which the low-voltage side terminals 56p, 56n are connected, whereby negative passing current flows from the first power lines 21p, 21n side to the second power lines 31p, 31n side.

The first battery ECU 74 is a computer mainly handling state monitoring of the first battery B1 and the ON/OFF operation of the contactors 22p, 22n of the first power circuit 2. The first battery ECU 74, based on a known algorithm using the detection value sent from the first battery sensor unit 81, calculates various parameters representing the internal state of the first battery B1, more specifically, the temperature of the first battery B1, internal resistance of the first battery B1, static voltage of the first battery B1, open-circuit voltage of the first battery B1, charge rate of the first battery B1, first output upper limit of the first battery B1, etc. The information related to the parameters representing the internal state of the first battery B1 acquired in the first battery ECU 74 is sent to the management ECU 71, for example.

Herein, first output upper limit of the first battery B1 is the upper limit for the power capable of being outputted from the first battery B1 at this time. In other words, since there is a concern over the first battery B1 degrading if making the output power of the first battery B1 greater than the first output upper limit, it is preferable for the output power of the first battery B1 to limit to no more than the first output upper limit. There is a tendency for the first output upper limit of the first battery B1 declining as the charge rate of the first battery B1 lowers. The first output upper limit of the first battery B1 is calculated by the first battery ECU 74 based on parameters representing the internal state of the first battery B1 such as the charge rate, temperature and internal resistance of the first battery B1.

The second battery ECU 75 is a computer mainly handling state monitoring of the second battery B2 and open/close operation of the contactors 32p, 32n of the second power circuit 3. The second battery ECU 75, based on a known algorithm using the detection value sent from the second battery sensor unit 32, calculates various parameters representing the internal state of the second battery B2, more specifically, the temperature of the second battery B2, internal resistance of the second battery B2, static voltage of the second battery B2, closed-circuit voltage of the second battery B2, charge rate of the second battery 82, second output upper limit of the second battery B2, etc. The information related to the parameters representing the internal state of the second battery B2 acquired in the second battery ECU 75 is sent to the management ECU 71, for example.

Herein, second output upper limit of the second battery B2 is the upper limit for the power capable of being outputted from the second battery B2 at this time. In other words, since there is a concern over the second battery B2 degrading if making the output power of the second battery 82 greater than the second output upper limit, it is preferable for the output power of the second battery B2 to limit to no more than the second output upper limit. There is a tendency for the second output upper limit of the second battery B2 declining as the charge rate of the second battery B2 lowers. The second output upper limit of the second battery B2 is calculated by the second battery ECU 75 based on parameters representing the internal state of the second battery B2 such as the charge rate, temperature and internal resistance of the second battery 82.

The management ECU 71 is a computer managing mainly the flow of electric power in the overall power supply system 1. The management ECU 71 generates a torque command signal corresponding to a command related to the drive torque or regenerative braking torque generated by the drive motor M, and a passing power command signal corresponding to a command related to electric power passing through the voltage converter 5, by executing the power management processing explained by referencing FIGS. 4 to 3 later.

In addition, the travel mode selection button 77 which is press operable upon the driver designating a travel mode of the vehicle V, and a monitor 78 visible to the driver, are connected to the management ECU 71.

In the power supply system 1, a plurality of travel modes having different acceleration force realized is defined, and the driver can designate any among this plurality of travel modes via operation of the travel mode selection button 77. Hereinafter, a case will be explained defining the three types of a standard normal mode, a sport mode capable of traveling under greater acceleration force than the normal mode, and a weak-boost mode capable of traveling under acceleration force greater than normal mode and less than sport mode, as the travel modes; however, the present invention is not limited thereto. The number of travel modes may be two, or may be four or more.

The travel mode selection button 77 sends any of the normal mode request signal indicating the normal mode being request as the travel mode, a weak-boost mode request signal indicating that the weak-boost mode is being requested as the travel mode, and a sport mode request signal indicating that the sport mode is being requested as the travel mode, to the management ECU 71 in response to the press operation by the driver (for example, number of presses). The request signal sent to the management ECU 71 from the travel mode selection button 77 is switched in order of normal mode request, signal, weak-boost mode request signal, sport mode request signal, normal mode request signal, every time the travel mode button 77 is pressed by the driver, for example. The management ECU 71 acquires the driver request mode which is the travel mode requested by the driver for the vehicle V, based on the request signal sent from the travel mode selection button 77. In other words, in the present embodiment, the travel mode request acquisition unit for acquiring the request for the travel mode of the vehicle V is configured by the travel mode selection button 77 and management ECU 71.

In addition, the management ECU 71 displays, on the monitor 78, information related to the travel mode as explained by referencing FIG. 5 later. In other words, in the present embodiment, a notification unit is configured by the management ECU 71 and monitor 78.

The motor ECU 72 is a computer mainly managing the flow of electric power from the first power circuit 2 to the electric motor M. Based on the torque command signal sent from the management ECU 71, the motor ECU 72 operates the power converter 43 so that the drive torque or regenerative braking torque according to this command generates in the drive motor M.

The converter ECU 73 is a computer which manages the flow of passing power, which is electric power passing through the voltage converter 5 mainly. The converter ECU 73 operates the voltage converter 5 so that passing power according to the command passes through the voltage converter 5, in response to the passing power command signal sent from the management ECU 71. More specifically, the converter ECU 73, based on the passing power command signal, calculates the target current, which is the target relative to the passing current of the voltage converter 5, and operates the voltage converter 6 following a known feedback control algorithm, so that passing current (hereinafter referred to as "actual passing current") detected by the current sensor 33 becomes the target current.

Figure 3A:
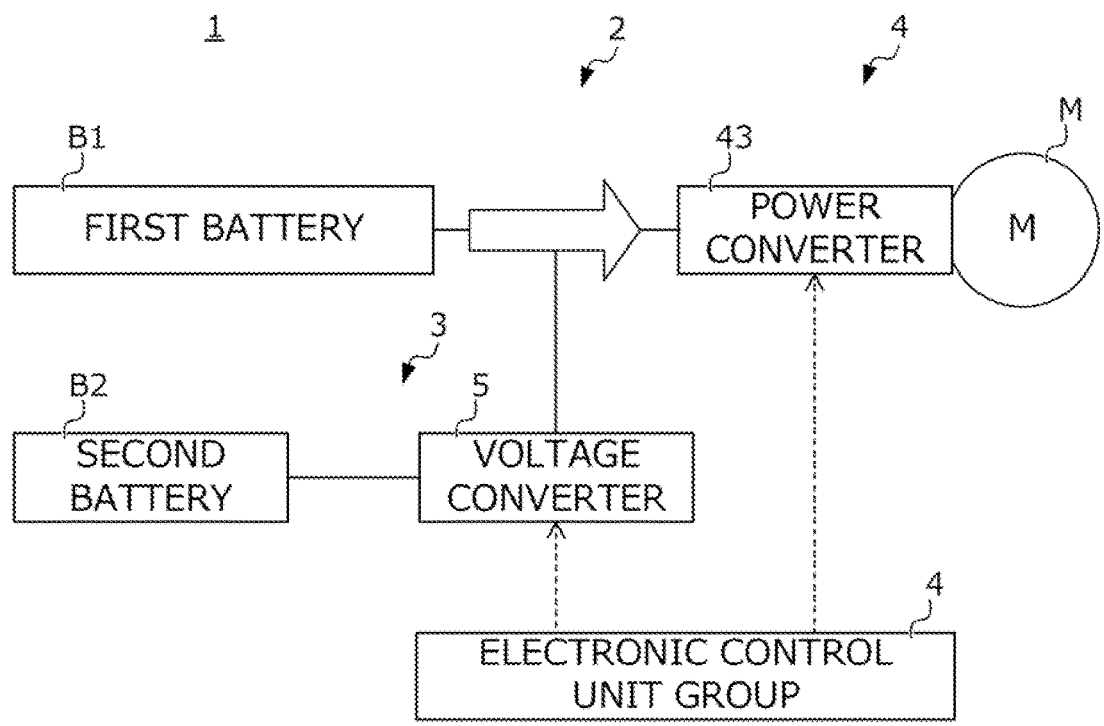
FIG. 3A is a view schematically showing the flow of electric power realized in the power supply system under a normal mode.
Figure 3B:
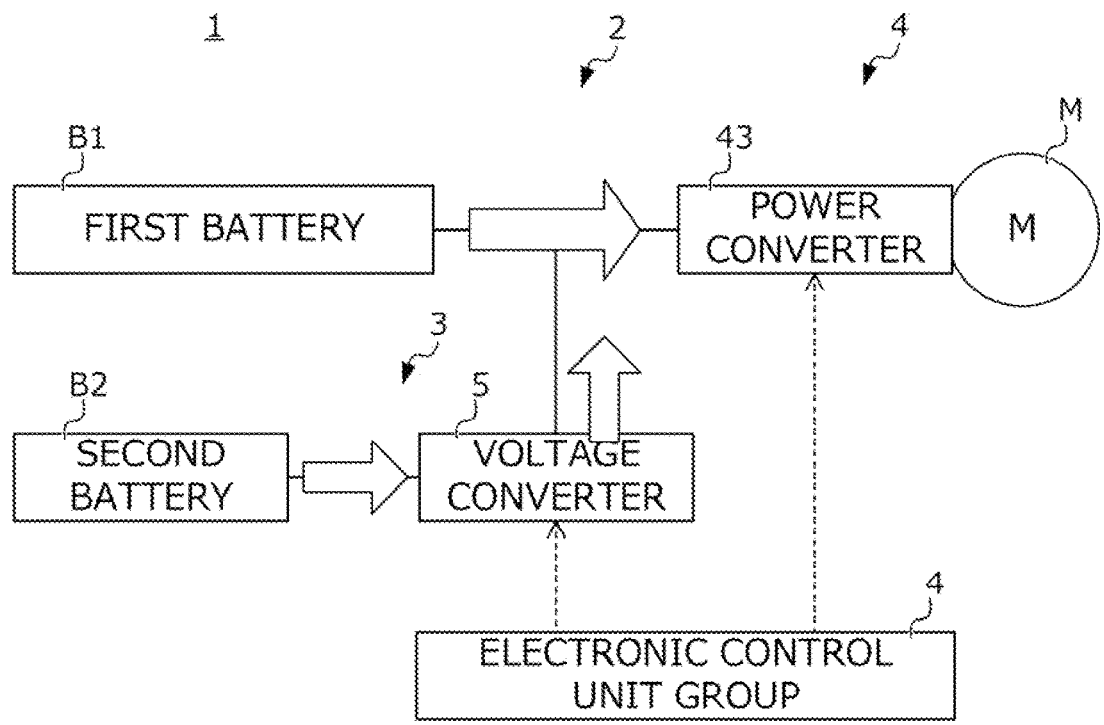
FIG. 3B is a view schematically showing the flow of electric power realized in the power supply system under a sport mode and weak-boost mode.

FIG. 3A is a view schematically showing the flow or electric power realized in the power supply system 1 under the normal mode, and FIG. 3B is a view schematically showing the flow of electric power realized in the power supply system 1 under the sport mode and weak-boost mode.

As shown in FIG. 3A, the electronic control unit group 7 operates the voltage converter 5 and power converter 43, so as to drive the drive motor M by the output power of the first battery B1, under the normal mode. Under the normal mode, the electronic control unit group 7 operates the voltage converter 5 so that the passing power from the second battery B2 towards the power converter 43 in the voltage converter 5 becomes 0, and sets the output power of the second battery B2 to 0. In this way, under the normal mode, in order to drive the drive motor M by the output power of only the first battery B1, the electronic control unit group 7 controls the output power of the first battery B1 so that the system output power which is the electric power outputted from the first power circuit 2 to the load circuit 4 becomes no more than the first output upper limit of the first battery B1.

Under the sport mode and weak-boost mode as shown in FIG. 3B, the electronic control unit group 7 combines the output power of the first battery B1 and output power of the second battery B2 according to the request in the load circuit 4, and operates the voltage converter 5 and power converter 43 so as to drive the drive motor M by the combined electric power. Under the sport mode and weak-boost mode, the electronic control unit group 7 operates the voltage converter 5 so that the passing power from the second battery B2 toward the power converter 43 in the voltage converter 5 in response to the request in the load circuit 4 becomes greater than 0, and increases the output power of the second battery B2 to greater than 0.

The flow of electric power realized under the sport mode and weak-boost mode in the above way are substantially the same; however, the upper limits for the system output power differ under these two travel modes. More specifically, under the sport mode, the electronic control unit group 7 controls the output power of the first battery BX and second battery B2 so that the system output power becomes no more than the total output upper limit, which is the sum of the first output upper limit of the first battery B1 and the second output upper limit of the second battery B2. In contrast, under the weak-boost mode, the electronic; control unit group 7 controls the output power of the first battery B1 and second battery B2 so that the system output power becomes no more than a weak-boost upper limit set to be less than a total output upper limit which is the upper limit for the sport mode, and greater than the first output upper limit which is the upper limit for the normal mode.

Figure 4:
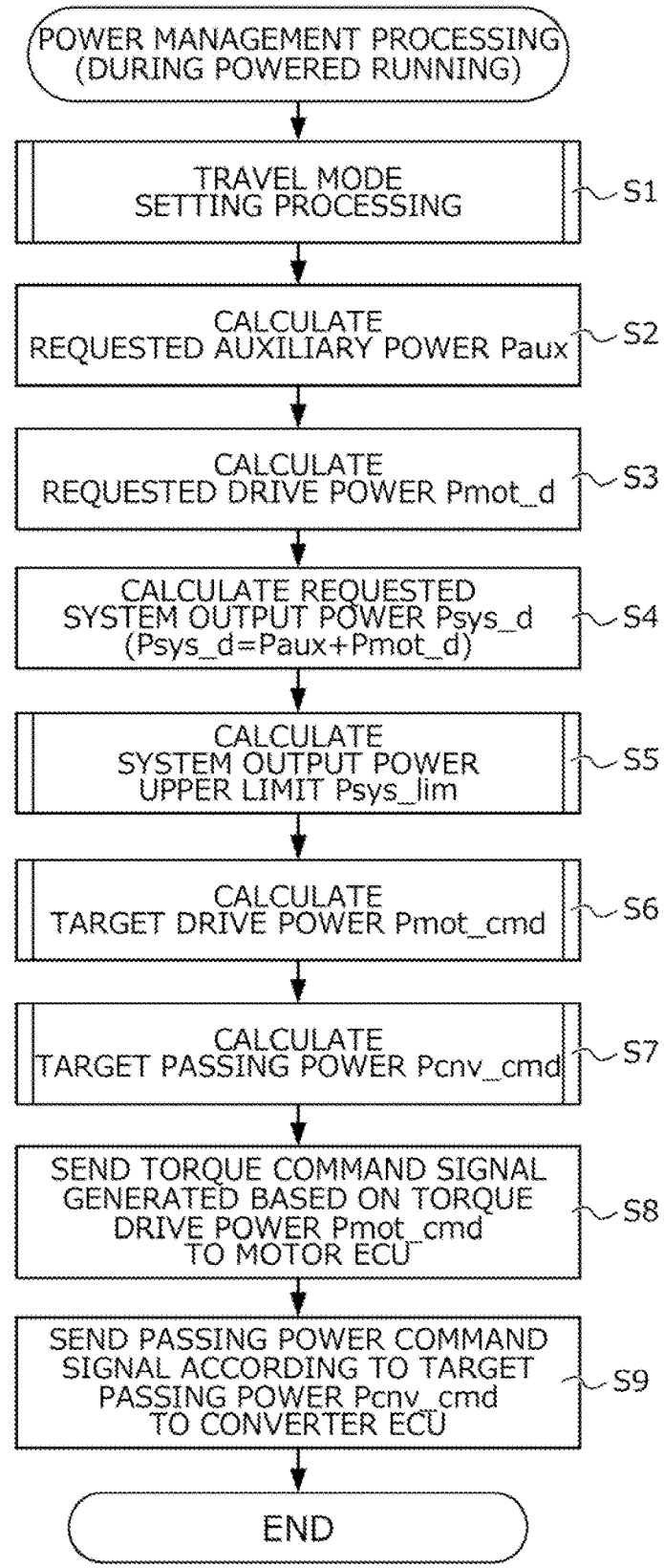
FIG. 4 is a flowchart showing a specific sequence of a power management processing during powered running of the drive motor.

FIG. 4 is a flowchart showing the specific sequence of the power management processing during powered running of the drive motor M. This power management processing is repeatedly executed at a predetermined period in the management ECU 71 during powered running of the drive motor M.

First, in Step S1, the management ECU 71 executes travel mode setting processing which sets any from among the three travel modes (normal mode, sport mode and weak-boost mode), based on the driver request mode acquired via the travel mode selection button 77, and then advances to Step S2.

Figure 5:
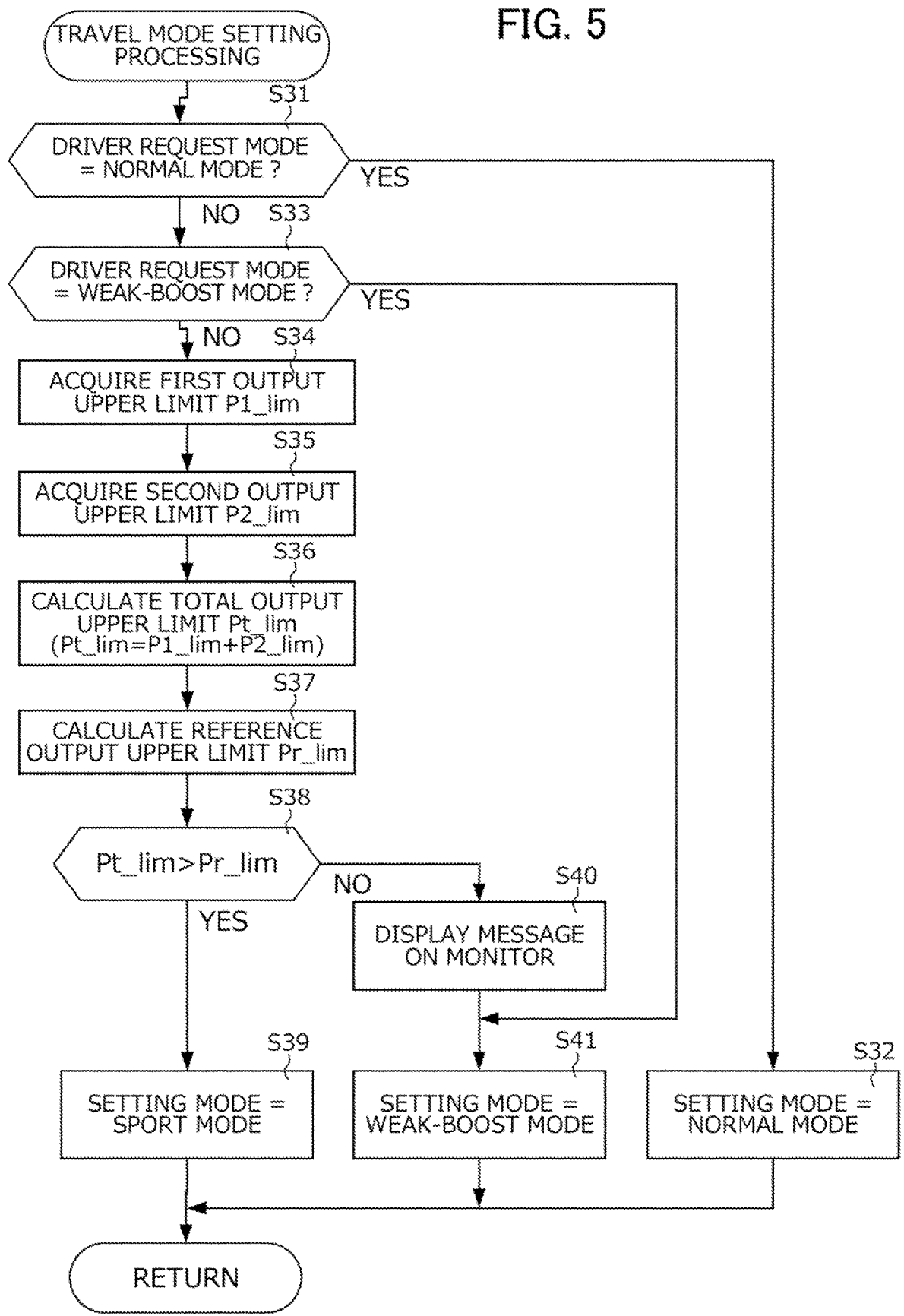
FIG. 5 is a flowchart showing a specific sequence of travel mode setting processing.

FIG. 5 is a flowchart showing a specific sequence of the travel mode setting processing. First, in Step S31, the management ECU 71 acquires the driver request mode based on the request signal sent from the travel mode selection button 77, and determines whether the driver request mode is the normal mode. The management ECU 71 advances to Step S32, in the case of the determination result in Step S31 being YES (case of the driver request mode being the normal mode), and advances to Step S34 in the case of the determination result in Step S31 being NO (case of the driver request mode being the weak-boost mode or sport mode).

In Step S32, the management ECU 71 sets the normal mode as the setting mode, and advances to the processing of Step S2 in FIG. 4.

In Step S33, the management ECU 71 determines whether the driver request mode is the weak-boost mode. The management ECU 71 advances to Step S41 in the case of the determination result in Step S33 being YES (case of the driver request mode being the weak-boost mode), and advances to Step S2 in FIG. 4 after setting the weak-boost mode as the setting mode. In addition, the management ECU 71 advances to Step S34 in the case of the determination result in Step S33 being NO (case of the driver request mode being the sport, mode).

In Step S34, the management ECU 71 acquires the first output upper limit P1_lim of the first battery B1 from the first battery ECU 74, and then advances to Step S35. In Step S35, the management ECU 71 acquires the second output upper limit P2_lim of the second battery B2 from the second battery ECU 75, and then advances to Step S36. In Step S36, the management ECU 71 calculates the total output upper limit Pt_lim, by summing the first output upper limit P1_lim and the second output upper limit P2_lim (Pt_lim=P1_lim+P2_lim), and then advances to Step S37. Therefore, in the present embodiment, the total output upper limit acquisition unit for acquiring the total output upper limit is configured by the first battery ECU 74, second battery ECU 75 and management ECU 71.

In Step S37, the management ECU 71 calculates a reference output upper limit Pr_lim corresponding to the upper limit for the power which can be outputted from the first battery B1 in a predetermined reference state, and the advances to Step S3S. Hereinafter, a case of setting the state of full charge as the reference state will be explained; however, the present invention is not limited thereto. For example, a state in which the charge rate of the first battery B1 is a reference charge rate decided within a predetermined range (50~100%) may be defined as the reference state. In addition, for example, a state during startup of the vehicle may be defined as the reference state. Therefore, in the present embodiment, the reference output upper limit acquisition unit for acquiring the reference output upper limit is configured by the first battery ECU 74 and management ECU 71.

It should be noted that, in the case of defining the state of full charge as the reference state, it is possible to use the first output upper limit of the first battery B1 when the charge rate is 100% as the reference output upper limit P1_lim. In addition, in the case of defining a state in which the charge rate is the reference charge rate as the reference state, it is possible to use the first output upper limit P1_lim of the first battery B1 when the charge rate is the reference charge rate as the reference output upper limit Pr_lim. In addition, in the case of setting the state during startup of the vehicle as the reference state, it is possible to use the first output upper limit P1_lim of the first battery B1 during startup of the vehicle as the reference output upper limit Pr_lim.

Under the normal mode as mentioned above, the system output power is limited to no more than the first output upper limit P1_lim of the first battery B1. Therefore, the reference output upper limit Pr_lim calculated in the above way corresponds to the upper limit for the system output power of the normal mode in the case of the first battery B1 being in the reference state.

In Step S38, the management ECU 71 determines whether the total output upper limit Pt_lim corresponding to the upper limit for the system output power of the sport mode is greater than the reference output upper limit Pr_lim corresponding to the upper limit for the system output power of the normal mode in the case of the first battery B1 being in the reference state.

In the case of the determination result in Step S38 being YES, i.e. case of the total output upper limit Pt_lim being greater than the reference output upper limit Pr_lim, the management ECU 71 advances to Step S2 in FIG. 4, after setting the sport mode which is the driver request mode as the setting mode (refer to Step 33S).

In the case of the determination result in Step S38 being NO, i.e. case of the total output upper limit Pt_lim being no more than the reference output upper limit Pr_lim, the management ECU 71 advances to Step S40 to inhibit changing of the setting mode to the sport mode. Herein, case of the total output upper limit Pt_lim being no more than the reference output upper limit Pr_lim corresponds to a case of the upper limit for the system output power of the sport mode using the existing first battery B1 and second battery B2 being no more than the upper limit for the system output power of the normal mode in the case of the first battery B1 being in the reference state. Therefore, when switching the setting mode in such a state from the normal mode to the sport mode, there is concern over the driver feeling a sense of discomfort when the acceleration force realized being lower, than the acceleration force realized under the normal mode using the first battery B1 in the reference state, irrespective of designating the travel mode as the sport mode.

Therefore, the management ECU 71, in the case of the determination result in Step S38 being NO, advances to Step S40 in order to inhibit a change of the setting mode to the sport mode to reduce the aforementioned such sense of discomfort. In Step S40, the management ECU 71 displays a message of the matter of not being able to set the setting mode to the sport mode on a monitor 78 visible by the driver, and then advances to Step S41. In the case of the determination result in Step S38 being NO, by displaying such a message on the monitor 78 to notify the driver of the matter of not being able to set the setting mode to the sport mode, the management ECU 71 can reduce the sense of discomfort felt by the driver by not being able to change the travel mode, irrespective of the driver designating the sport mode as the travel mode.

Step S41, the management ECU 71 advances to Step S2 in FIG. 4 after setting the weak-boost mode as the setting mode.

Referring back to FIG. A, in Step S2, the management ECU 71 calculates the requested auxiliary power Paux which is the power, requested in the vehicle auxiliary 42, and then advances to Step S3. The management ECU 71 calculates the requested auxiliary power Paux based on the information related to the operating sate of various electrical loads sent from the vehicle auxiliary 42.

In Step S3, the management ECU 71 calculates the requested driving power Pmot_d corresponding to a request for the power supplied from the first power circuit 2 to the drive motor M via the power converter 43 during powered running of the drive motor M, and then advances to the Step S4. The management ECU 71 calculates the requested drive power Pmot_d by calculating the requested drive torque corresponding to the request for drive torque generated by the drive motor M based on the operated amount of the pedals P such as the accelerator pedal and brake pedal by the driver (refer to FIG. 1) and/or a predetermined function of an advanced driver aid system (for example, adaptive cruise control), and converting this requested drive torque into power.

In Step S4, the management ECU 71 calculates the requested system output power Psys_d corresponding to the request for the system output power, by summing the requested auxiliary power Paux calculated in Step S2 and the requested drive power Pmot_d calculated in Step S3, and then advances to Step S5.

In Step S5, the management ECU 71 calculates the system output power upper limit Psys_lim which is the upper limit for the system output power, and then advances to Step S6.

Figure 6:
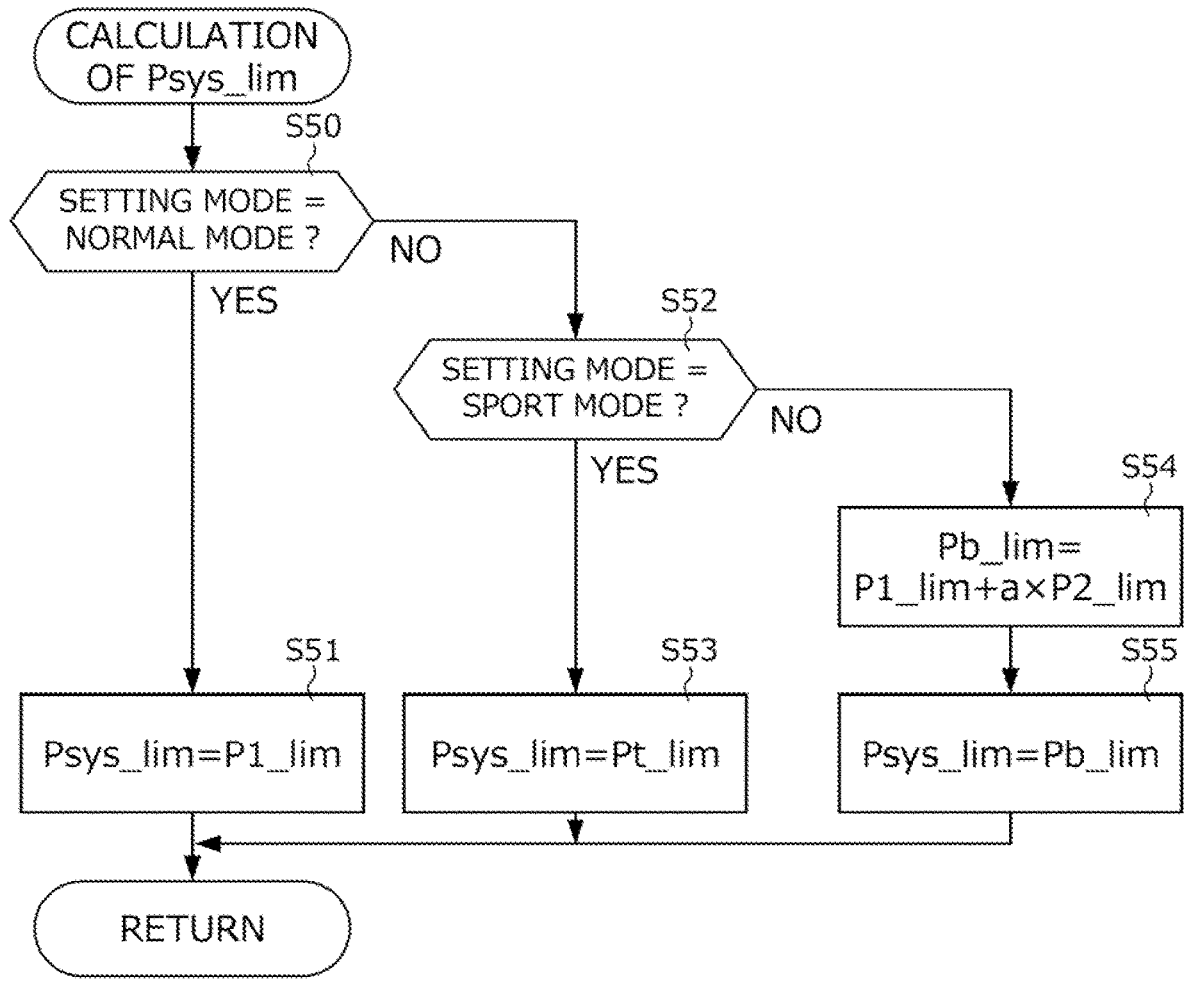
FIG. 6 is a flowchart showing a sequence of calculating a system output power upper limit.

FIG. 6 is a flowchart showing a sequence of calculating the system output power upper limit Psys_Lim.

First, in Step S50, the management ECU 71 determines whether the setting mode is the normal mode. The management ECU 71 advances to Step SSI in the case of the determination result in Step S50 being YES (case of the setting mode being the normal mode), and advances to Step S52 in the case of the determination result in Step S50 being NO.

In Step S51, the management ECU 71 establishes the first output upper limit P1_lim of the first battery B1 as the system output power upper limit Psys_lim, and then advances to Step S6 in FIG. 4.

In Step S52, the management ECU 71 determines whether the setting mode is the sport mode. The management ECU 71 advances to Step S53 in the case of the determination result in Step S52 being YES (case of the setting mode being the sport mode), and advances to Step S54 in the case of the determination result in Step S52 being NO (case of the setting mode being the weak-boost mode).

In Step S53, the management ECU 71 defines the total output upper limit Pt_lim arrived at by adding the first output upper limit P1_lim of the first battery B1 and the second output upper limit P2_lim of the second battery B2 as the system output power upper limit Psys_lim, and then advances to Step S6 in FIG. 4.

In Step S54, the management ECU 71 calculates the weak-boost upper limit Pb_lim by summing the first output upper limit P1_lim of the first battery B1 and a value arrived at by multiplying a coefficient "a" greater than 0 and less than 1 by the second output upper limit P2_lim of the second battery B2, and then advances to Step S55. The weak-boost upper limit Pb_lim calculated in the above way is greater than the first output upper limit P1_lim and smaller than the total output upper limit Pt_lim.

In Step S55, the management ECU 71 defines the weak-boost upper limit Pb_lim as the system output power upper limit Psys_lim, and then advances to Step S6 in FIG. 4.

Referring back, to FIG. 4, in Step S6, the management ECU 71 calculates the target drive power Pmot_cmd corresponding to the target for the power supplied from the first power circuit 2 to the drive motor M, and then advances to Step S7.

Figure 7:
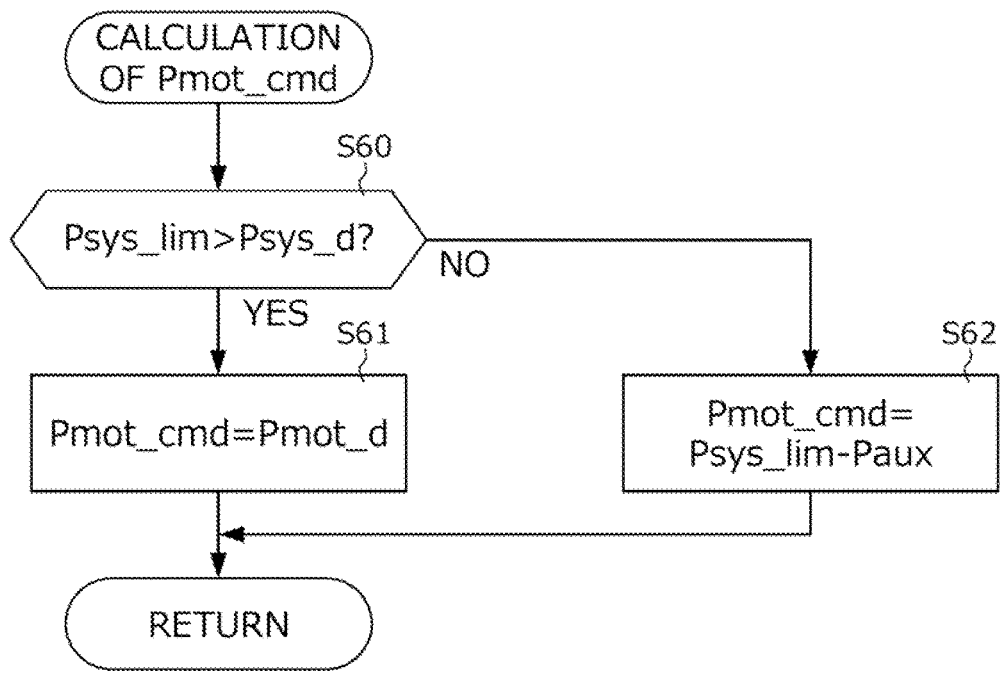
FIG. 7 is a flowchart showing a sequence of calculating a target drive power.

FIG. 7 is a flowchart showing a sequence of calculating the target drive power Pmot_cmd.

First, in Step S60, the management ECU 71 determines whether the system output power upper limit Psys_lim is greater than the requested system output power Psys_d. The management ECU 71 advances to Step S61 in the case of the determination result in Step S60 being YES, and advances to Step S62 in the case of the determination result in Step S60 being NO.

In Step S61, the management ECU 71 defines the requested drive power Pmot_d calculated in Step S3 as the target drive power Pmot_cmd, and then advances to Step S7 in FIG. 4.

In Step S62, the management ECU 71 defines a value arrived at by subtracting the requested auxiliary power Paux from the system output power upper limit Psys_lim as the target, drive power Pmot_cmd, and then advances to Step S7 in FIG. 4.

In the processing shown in FIG. 7, by calculating the target drive power Pmot_cmd by the above such sequence, it is possible to limit the system output power to no more than the system output power upper limit Psys_lim.

Referring back to FIG. A, in Step S7, the management ECU 71 calculates the target passing power Pcnv_cmd corresponding to the target for the passing power (i.e. output power of the second battery B2) flowing through the voltage converter 5 from the second power circuit 3 side to the first power circuit 2 side during powered running of the drive motor M, and then advances to Step S8.

Figure 8:
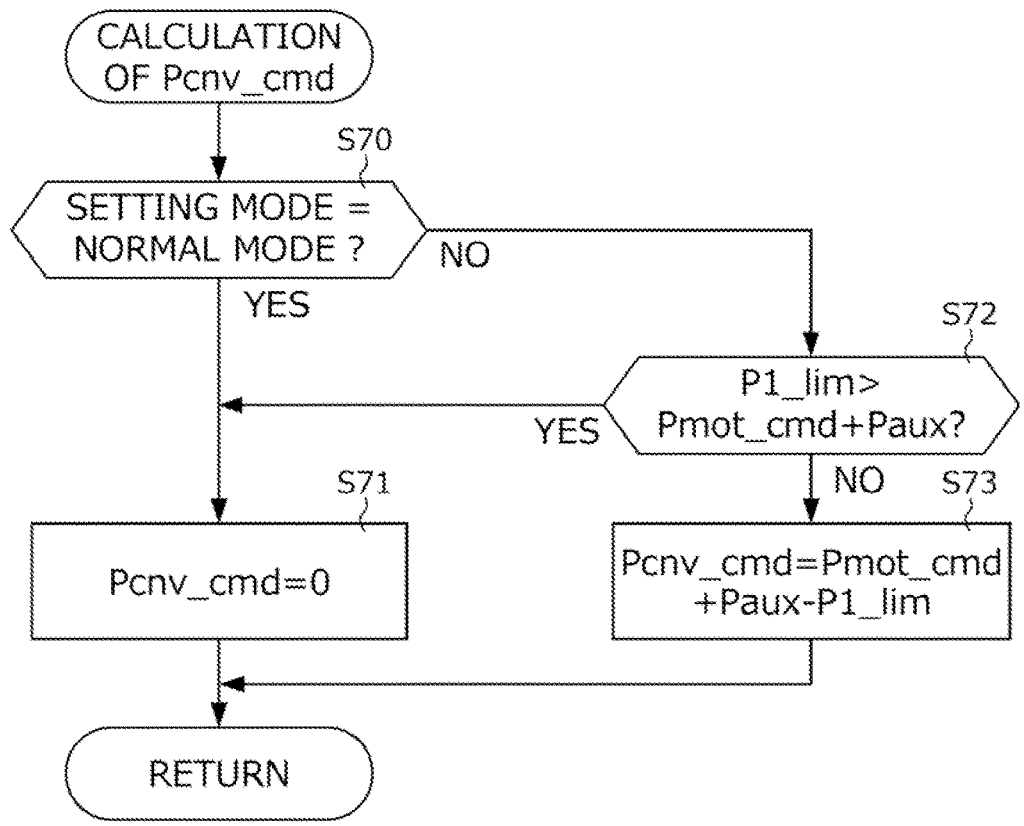
FIG. 8 is a flowchart showing a sequence of calculating a target passing power.

FIG. 8 is a flowchart showing the sequence of calculating the target passing power Pcnv_cmd.

First, in Step S70, the management ECU 71 determines whether the setting mode is the normal mode. The management ECU 71 advances to Step S71 in the case of the determination result in Step S70 being YES (case of the setting mode being the normal mode), and advances to Step S72 in the case of the determination result in Step S70 being NO.

In Step S71, the management ECU 71 defines the value 0 as the target passing power Pcnv_cmd, and advances to Step S8 in FIG. 4.

In Step S72, the management ECU 71 determines whether the first output upper limit P1_lim of the first battery B1 is larger than the sum of the target drive output Pmot_cmd and the requested auxiliary power Paux. The management ECU 71 advances to Step S71 in the case of the determination result in S72 being YES (i.e. case of being able to realize the target drive power Pmot_cmd with only the first, battery B1), sets the value 0 as the target passing power Pcnv_cmd, and then advances to Step S8 in FIG. 4.

The management ECU 71 defines a value arrived at by subtracting the first output upper limit P1_lim of the first battery B1 from the sum of the target drive power Pmot_cmd and the requested auxiliary power Paux in the case of the determination result in Step S72 being NO (i.e. case not being able to realize the target drive power Pmot_cmd with only the first battery B1) as the target passing power Pcnv_cmd (refer to Step S73), and then advances to Step S3 in FIG. 4.

Referring backing to FIG. 4, in Step S3, the management ECU 71 generates the torque command signal based on the target drive power Pmot_cmd calculated in Step 36, sends this to the motor ECU 72, and then advances to Step S9. More specifically, the management ECU 71 calculates the target drive torque by converting the target drive power. Pmot_cmd into torque, and generates a torque command signal according to this target drive torque. The motor ECU 72 operates the power converter 43 based on this torque command signal. The power according to the target, drive power Pmot_cmd is thereby outputted from the first power circuit 2 to the drive motor M.

In Step S9, the management ECU 71 generates the passing power command signal according to the target passing power Pcnv_cmd calculated in Step S7, sends this to the converter ECU 73, and then ends the management processing shown in FIG. 4. The converter ECU 73 operates the voltage converter 5 based on this passing power command signal. The power according to the target passing power Pcnv_cmd is thereby outputted from the second battery B2 to the first power circuit 2.

The following effects are exerted by the power supply system 1 according to the above such present embodiment.

(1) Based on the driver request mode for the travel mode, the management ECU 71 sets any from among the plurality of travel modes including the normal mode of traveling by the output power of the first battery B1 and the sport mode of combining the output power of the first and second batteries B1, B2 and traveling by the combined power, as the setting mode, and the electronic control unit group 7 controls the flow of power in the power circuit by operating the voltage converter 5 and power converter 43 in a condition according to the setting mode. The management ECU 71 does not change the setting mode to the sport mode irrespective of the request from the driver for the travel, mode, in the case of the setting mode being the normal mode, and the total output upper limit Pt_lim of the first battery B1 and second battery B2 being lower than the reference output upper limit Pr_lim of the first battery B1 in the reference state. In other words, it inhibits change from the normal mode to the sport mode.

Figure 9:
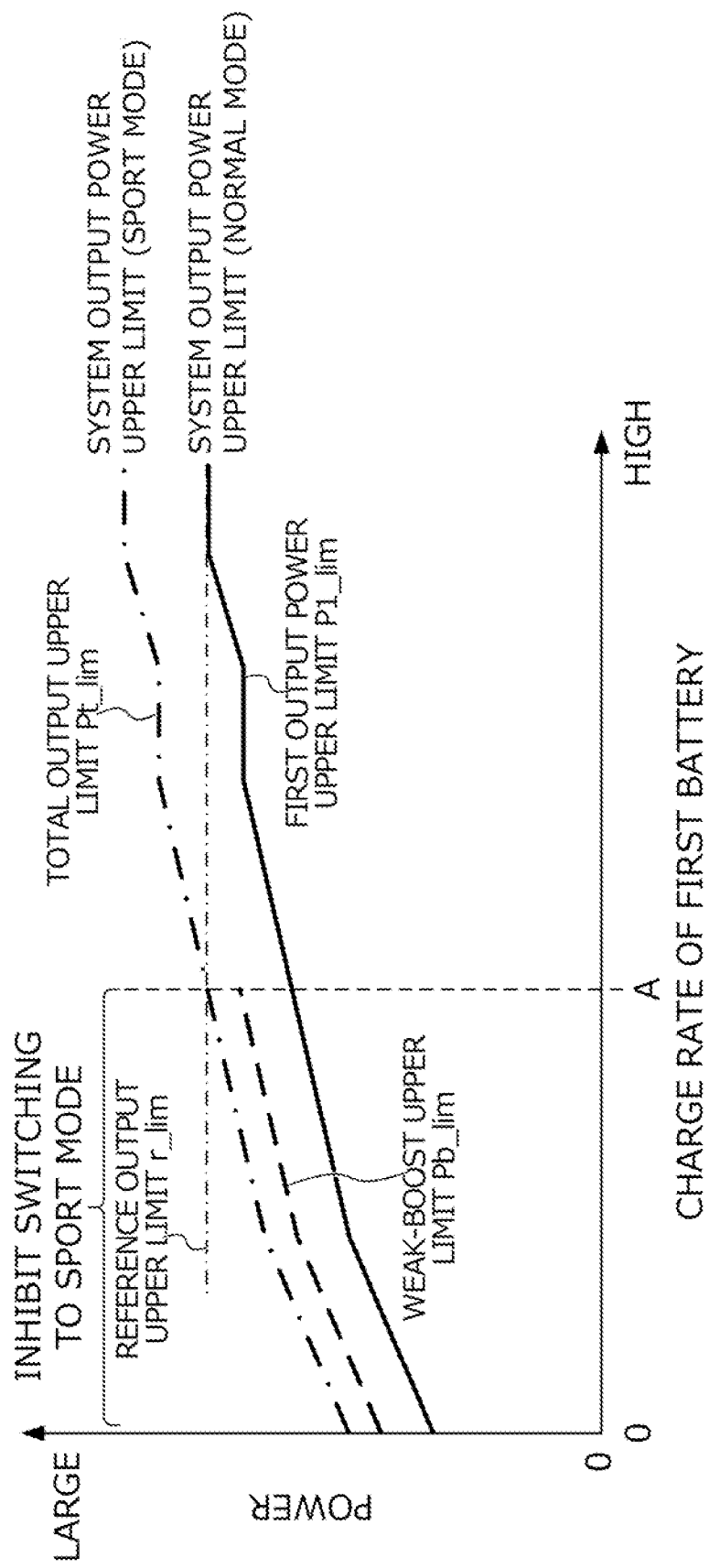
FIG. 9 is a graph comparing a system output power upper limit in the sport mode and a system output power upper limit in the normal mode.

FIG. 9 is a view comparing a system output power upper limit Psys_lim (bold dotted line) in the sport mode, and the system output power upper limit Psys_lim (bold solid line) in the normal mode. FIG. 9 shows a graph defining the horizontal axis as the charge rate of the first battery B1 and the vertical axis as power, and plotting the system output power upper limits in the sport mode and normal mode in the case of changing the charge rate of the first battery B1 while maintaining the charge rate of the second battery B2 at a predetermined value.

As shown in FIG. 9, the system output power upper limit Psys_lim in the normal mode is equal to the first output upper limit P1_lim of the first battery B1; therefore, it becomes smaller as the charge rate of the first battery B1 declines. In addition, the system output power upper limit Psys_lim in the sport mode is equal to the total output upper limit Pt_lim summing the first battery B1 and second battery B2; therefore, it is always greater than the system output power upper limit Psys_lim in the normal mode.

In addition, the reference output upper limit Pr_lim shown by the thin dashed line in FIG. 9 corresponds to the first output upper limit P1_lim of the first battery B1 when the first battery B1 is a predetermined reference state as mentioned above. Herein, in the example of FIG. 9, the case of the charge rate of the first battery B1 being lower than the charge rate A shown by the thin broken line, i.e. the case of the total output upper limit Pt_lim being smaller than the reference output upper limit Pr_lim, corresponds to a case in which the power capable of being outputted to the load circuit A under the sport mode using the existing first and second batteries B1, B2 is no more than the power capable of being outputted to the load circuit 4 under the normal mode using the first battery B1 in the reference state. Therefore, in the present, embodiment, in such a case, by inhibiting a change to the sport mode which is the setting mode irrespective of the driver requested mode, it is possible to reduce the sense of discomfort felt by the driver by the realized acceleration force being lower than the acceleration force realized under the normal mode using the first battery B1 in the reference state, irrespective of setting the travel mode as the sport mode. In addition, according to the present embodiment, it is possible to also suppress a decline in the charge rate of the second battery B2.

(2) The power supply system 1 uses a battery having lower output weight density and higher energy density than the second battery B2 as the first battery B1. In other words, a capacity-type battery is used as the first battery B1, and an output-type battery is used as the second battery B2 used supplementarily under the sport mode. Therefore, according to the power supply system 1, it is possible to decrease the frequency of inhibiting a change from the normal mode to the sport mode.

(3) In the power supply system 1, the management ECU 71 sets the state in which the charge rate is the predetermined reference charge rate as the reference state, and calculates the reference output upper limit Pr_lim. Therefore, according to the power supply system, it is possible to reduce the sense of discomfort felt by the driver, by the realized acceleration force being lower than the acceleration force realized under the normal mode using the first battery B1 in a state in being a predetermined reference charge rate, irrespective of setting the travel mode as the sport mode.

(4) In the power supply system 1, the management ECU 71 sets the full charge state as the reference state, and calculates the reference output upper limit Pr_lim. Therefore, according to the power supply system 1, irrespective of setting the travel mode as the sport mode, it is possible to reduce sense of discomfort felt by the driver, by the realized acceleration force being lower than the acceleration force realized under the normal mode using the first battery B1 in the full charge state.

(5) In the power supply system 1, the management ECU 71 sets the state during startup of the vehicle V as the reference state, and calculates the reference output, upper limit Pr_lim. Therefore, according to the power supply system 1, irrespective of setting the travel mode as the sport mode, it is possible to reduce the sense of discomfort felt by the driver, by the realized acceleration force being lower than the acceleration force realized under the normal mode immediately after starting up the vehicle V.

(6) In the power supply system 1, in the case of the setting mode being the normal mode, and the total output upper limit Pt_lim being smaller than the reference output upper limit Pr_lim, the management ECU 71 displays a message of the matter that it is not possible to set the setting mode to the sport mode on the monitor 78 which is visible by the driver, thereby notifying the driver. It is thereby possible to reduce the sense of discomfort felt by the driver, by not being able to switch the travel mode to the sport mode.

(7) In the power supply system 1, the management ECU 71 changes the setting mode to the weak-boost mode separate from the normal, mode and sport mode, in the case of the driver request mode switching from the normal mode to the sport mode, while a change, from the normal mode to the sport mode is inhibited as mentioned above. In addition, the management ECU 71, in the case of the setting mode being the normal mode, sets the system output power as no more than the first output upper limit P1_lim, and in the case of the setting mode being the sport mode, sets the system output power as no more than the total output upper limit Pt_lim, and in the case of the setting mode being the weak-boost mode, sets the system output power as no more than a weak-boost upper limit Pb_lim (refer to bold broken line in FIG. 9), set to be less than the total output upper limit Pt_lim and greater than the first output upper limit P1_lim. In other words, in the case of the driver request mode switching from the normal mode to the sport mode while a change from the normal mode to the sport mode being inhibited, the power supply system 1 notifies the driver of the fact that it is not possible to switch the travel mode to the sport mode by displaying a message on the monitor 78 as mentioned above, and permits a system output power within a range of no more than the weak-boost upper limit Pb_lim set to be smaller than the upper limit in the sport mode. It is thereby possible to reduce the sense of discomfort felt by the driver, and react to the acceleration request by the driver as much as possible.

Although an embodiment of the present invention has been explained above, the present invention is not to be limited thereto. The configurations of detailed parts may be modified where appropriate within the scope of the gist of the present invention.

For example, the above-mentioned embodiment explains a case in which the management ECU 71, when the total output upper limit Pt_lim is no more than the reference output upper limit Pr_lim, sets the weak-boost mode as the setting mode (refer to Step S38, S40 and S41 in FIG. 5); however, the present invention is not limited thereto. The management ECU 71, in the case of the total output upper limit Pt_lim being no more than the reference output, upper limit Pr_lim, may display a message on the monitor 78 of the fact that it is not possible to set the setting mode to the sport mode (refer to Step S40 in FIG. 5), and then set the normal mode as the setting mode.

For example, the above-mentioned embodiment explains a case in which the management ECU 71 serving as the travel inode request acquisition unit acquires the request for the travel mode of the vehicle V based on a signal sent from the travel mode selection button 77 operated by the driver; however, the present invention is not limited thereto. The management ECU 71 may acquire the request for the travel mode of the vehicle V based on a signal sent from pedals P such as the accelerator pedal and brake pedal operated by the driver, for example.

For example, the above-mentioned embodiment explains a case of defining the three types of travel modes of the normal mode, sport mode and weak-boost mode, and the driver being able to select any of these three types of travel modes via a pressing operation of the travel mode selection button 77; however, the present invention is not limited thereto. For example, it may be configured so that the driver can actively designate only the two of the normal mode and the sport mode among the three types of travel modes via a pressing operation of the travel mode selection button 77.

What is claimed is:
1. A power supply system comprising:
   a rotary electrical machine coupled to a drive wheel of a vehicle;
   a first electrical storage device;
   a second electrical storage device;
   a power circuit connecting the first electrical storage device, the second electrical storage device and the rotary electrical machine;
   a travel mode request acquisition unit for acquiring a request for a travel mode of the vehicle;
   a travel mode setting unit for setting based on a request acquired by the travel mode request acquisition unit, as a setting mode, any one from among a plurality of travel modes including a first travel mode of driving the rotary electrical machine by output power of the first electrical storage device, and a second travel mode of combining output power of the first electrical storage device and output power of the second electrical storage device, and driving the rotary electrical machine by way of power thus combined;
   a control unit for controlling flow of power in the power circuit based on the setting mode;
   a total output upper limit acquisition unit for acquiring, as a total output upper limit, a sum of a first output upper limit which is an upper limit for power capable of being outputted from the first electrical storage device and a second output upper limit which is an upper limit for power capable of being outputted from the second electrical storage device; and a reference output upper limit acquisition unit for acquiring a reference output upper limit which is an upper limit for power capable of being outputted from the first electrical storage device in a reference state, wherein the travel mode setting unit inhibits a change of the setting mode to the second travel mode, in a case of the setting mode being the first travel mode, and the total output upper limit being smaller than the reference output upper limit, even if the travel mode request acquisition unit acquires a request to change the travel mode to the second travel mode.

2. The power supply system according to claim 1, wherein the first electrical storage device has lower output weight density and higher energy weight density than the second electrical storage device.

3. The power supply system according to claim 2, further comprising a notification unit for notifying to a driver of a matter of not being possible to change the setting mode to the second travel mode, in a case of the setting mode being the first travel mode, and the total output upper limit being smaller than the reference output upper limit.

4. The power supply system according to claim 3, wherein the travel mode setting unit, in a case of the setting mode being the first travel mode, the total output upper limit being smaller than the reference output upper limit, and the travel mode request acquisition unit acquiring a request for switching the travel mode from the first travel mode to the second travel mode, combines the output power of the first electrical storage device and the output power of the second electrical storage device, and changes the setting mode from the first travel mode to a third travel mode which drives the rotary electrical machine using power thus combined; and wherein the control unit, in a case of the setting mode being the first travel mode, controls output power of the first electrical storage device so that system output power which is power outputted to a load circuit including the rotary electrical machine from the power circuit becomes no more than the first output upper limit; in a case of the setting mode being the second travel mode, controls output power of the first electrical storage device and output power of the second electrical storage device so that the system output power becomes no more than the total output upper limit; and in a case of the setting mode being the third travel mode, controls the output power of the first electrical storage device and the output power of the second electrical storage device so that the system output power becomes no more than a third output upper limit decided to be less than the total output upper limit and greater than the first output upper limit.

5. The power supply system according to claim 1, wherein the reference output upper limit acquisition unit sets a state in which a charge rate is a predetermined reference charge rate as the reference state, and acquires the reference output upper limit.

6. The power supply system according to claim 5, wherein the reference output upper limit acquisition unit sets a full charge state as the reference state, and acquires the reference output upper limit.

7. The power supply system according to claim 6, further comprising a notification unit for notifying to a driver of a matter of not being possible to change the setting mode to the second travel mode, in a case of the setting mode being the first travel mode, and the total output upper limit being smaller than the reference output upper limit.

8. The power supply system according to claim 7, wherein the travel mode setting unit, in a case of the setting mode being the first travel mode, the total output upper limit being smaller than the reference output upper limit, and the travel mode request acquisition unit acquiring a request for switching the travel mode from the first travel mode to the second travel mode, combines the output power of the first electrical storage device and the output power of the second electrical storage device, and changes the setting mode from the first travel mode to a third travel mode which drives the rotary electrical machine using power thus combined; and wherein the control unit, in a case of the setting mode being the first travel mode, controls output power of the first electrical storage device so that system output power which is power outputted to a load circuit including the rotary electrical machine from the power circuit becomes no more than the first output upper limit; in a case of the setting mode being the second travel mode, controls output power of the first electrical storage device and output power of the second electrical storage device so that the system output power becomes no more than the total output upper limit; and in a case of the setting mode being the third travel mode, controls the output power of the first electrical storage device and the output power of the second electrical storage device so that the system output power becomes no more than a third output upper limit decided to be less than the total output upper limit and greater than the first output upper limit.

9. The power supply system according to claim 5, further comprising a notification unit for notifying to a driver of a matter of not being possible to change the setting mode to the second travel mode, in a case of the setting mode being the first travel mode, and the total output upper limit being smaller than the reference output upper limit.

10. The power supply system according to claim 9, wherein the travel mode setting unit, in a case of the setting mode being the first travel mode, the total output upper limit being smaller than the reference output upper limit, and the travel mode request acquisition unit acquiring a request for switching the travel mode from the first travel mode to the second travel mode, combines the output power of the first electrical storage device and the output power of the second electrical storage device, and changes the setting mode from the first travel mode to a third travel mode which drives the rotary electrical machine using power thus combined; and wherein the control unit, in a case of the setting mode being the first travel mode, controls output power of the first electrical storage device so that system output power which is power outputted to a load circuit including the rotary electrical machine from the power circuit becomes no more than the first output upper limit; in a case of the setting mode being the second travel mode, controls output power of the first electrical storage device and output power of the second electrical storage device so that the system output power becomes no more than the total output upper limit; and in a case of the setting mode being the third travel mode, controls the output power of the first electrical storage device and the output power of the second electrical storage device so that the system output power becomes no more than a third output upper limit decided to be less than the total output upper limit and greater than the first output upper limit.

11. The power supply system according to claim 1, wherein the reference output upper limit acquisition unit sets a state during startup of the vehicle as the reference state, and acquires the reference output upper limit.

12. The power supply system according to claim 11, further comprising a notification unit for notifying to a driver of a matter of not being possible to change the setting mode to the second travel mode, in a case of the setting mode being the first travel mode, and the total output upper limit being smaller than the reference output upper limit.

13. The power supply system according to claim 12, wherein the travel mode setting unit, in a case of the setting mode being the first travel mode, the total output upper limit being smaller than the reference output upper limit, and the travel mode request acquisition unit acquiring a request for switching the travel mode from the first travel mode to the second travel mode, combines the output power of the first electrical storage device and the output power of the second electrical storage device, and changes the setting mode from the first travel mode to a third travel mode which drives the rotary electrical machine using power thus combined; and wherein the control unit, in a case of the setting mode being the first travel mode, controls output power of the first electrical storage device so that system output power which is power outputted to a load circuit including the rotary electrical machine from the power circuit becomes no more than the first output upper limit; in a case of the setting mode being the second travel mode, controls output power of the first electrical storage device and output power of the second electrical storage device so that the system output power becomes no more than the total output upper limit; and in a case of the setting mode being the third travel mode, controls the output power of the first electrical storage device and the output power of the second electrical storage device so that the system output power becomes no more than a third output upper limit decided to be less than the total output upper limit and greater than the first output upper limit.

14. The power supply system according to claim 1, further comprising a notification unit for notifying to a driver of a matter of not being possible to change the setting mode to the second travel mode, in a case of the setting mode being the first travel mode, and the total output upper limit being smaller than the reference output upper limit.

15. The power supply system according to claim 14, wherein the travel mode setting unit, in a case of the setting mode being the first travel mode, the total output upper limit being smaller than the reference output upper limit, and the travel mode request acquisition unit acquiring a request for switching the travel mode from the first travel mode to the second travel mode, combines the output power of the first electrical storage device and the output power of the second electrical storage device, and changes the setting mode from the first travel mode to a third travel mode which drives the rotary electrical machine using power thus combined; and wherein the control unit, in a case of the setting mode being the first travel mode, controls output power of the first electrical storage device so that system output power which is power outputted to a load circuit including the rotary electrical machine from the power circuit becomes no more than the first output upper limit; in a case of the setting mode being the second travel mode, controls output power of the first electrical storage device and output power of the second electrical storage device so that the system output power becomes no more than the total output upper limit; and in a case of the setting mode being the third travel mode, controls the output power of the first electrical storage device and the output power of the second electrical storage device so that the system output power becomes no more than a third output upper limit decided to be less than the total output upper limit and greater than the first output upper limit.

* * * * *